US010326302B2

(12) United States Patent
Humphrey et al.

(10) Patent No.: US 10,326,302 B2
(45) Date of Patent: Jun. 18, 2019

(54) BALANCING A LOAD BETWEEN POWER SUPPLIES TO INCREASE EFFICIENCY

(71) Applicant: HEWLETT PACKARD ENTERPRISE DEVELOPMENT LP, Houston, TX (US)

(72) Inventors: Daniel Humphrey, Cypress, TX (US); Mohamed Amin Bemat, Cypress, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 160 days.

(21) Appl. No.: 14/431,694

(22) PCT Filed: Sep. 27, 2012

(86) PCT No.: PCT/US2012/057516
§ 371 (c)(1),
(2) Date: Mar. 26, 2015

(87) PCT Pub. No.: WO2014/051587
PCT Pub. Date: Apr. 3, 2014

(65) Prior Publication Data
US 2015/0249363 A1 Sep. 3, 2015

(51) Int. Cl.
*H02J 9/00* (2006.01)
*H02J 1/10* (2006.01)
*H02J 4/00* (2006.01)

(52) U.S. Cl.
CPC ............... *H02J 9/00* (2013.01); *H02J 1/102* (2013.01); *H02J 4/00* (2013.01); *H02J 2001/106* (2013.01); *Y10T 307/505* (2015.04)

(58) Field of Classification Search
CPC ........ H02J 1/10; H02J 1/00; H02J 4/00; H02J 9/00; Y10T 307/00
USPC .......................................................... 307/44
See application file for complete search history.

(56) References Cited

U.S. PATENT DOCUMENTS

| 6,885,176 B2 | 4/2005 | Librizzi |
| 7,370,213 B2 | 5/2008 | Odaohhara |
| 8,058,858 B2 | 11/2011 | Gan |
| 8,106,634 B2 | 1/2012 | Hojo et al. |

(Continued)

FOREIGN PATENT DOCUMENTS

JP 7298616 11/1995

OTHER PUBLICATIONS

ISR/WO PCT/US2012/057516, HP reference 83096235, dated Apr. 24, 2013, 10 pps.

(Continued)

*Primary Examiner* — Fritz M Fleming
*Assistant Examiner* — Joseph N Inge
(74) *Attorney, Agent, or Firm* — Hewlett Packard Enterprise Patent Department

(57) ABSTRACT

Examples disclose a power system comprising a first power supply to provide a first power to a load. Further, the power system comprises a second power supply to detect a droop in the first power to the load, the droop associated with a decrease in efficiency of the first power supply. Additionally, the second power supply is to balance the load based on the droop detection by providing a second power in addition to the first power to the load to increase the efficiency of the power system.

16 Claims, 5 Drawing Sheets

(56) References Cited

U.S. PATENT DOCUMENTS

| | | | |
|---|---|---|---|
| 2001/0002772 A1 | 6/2001 | Kim et al. | |
| 2001/0025838 A1* | 10/2001 | Kraus | B23K 9/1006 |
| | | | 219/137 PS |
| 2004/0041472 A1 | 3/2004 | Chan et al. | |
| 2007/0205664 A1* | 9/2007 | Kawakubo | G06F 1/263 |
| | | | 307/23 |
| 2009/0091294 A1 | 4/2009 | Gong et al. | |
| 2011/0068634 A1* | 3/2011 | Kammeter | H02J 1/102 |
| | | | 307/82 |
| 2011/0084677 A1 | 4/2011 | Shi et al. | |
| 2011/0298290 A1 | 12/2011 | Ban et al. | |
| 2012/0086276 A1* | 4/2012 | Sawyers | H02J 1/12 |
| | | | 307/66 |
| 2012/0303993 A1* | 11/2012 | Nishtala | G06F 1/28 |
| | | | 713/340 |
| 2013/0163297 A1* | 6/2013 | Phadke | H02J 3/26 |
| | | | 363/65 |

OTHER PUBLICATIONS

Quan Li, "Light Load Efficiency Improvement for PFC", Sep. 20-24, 2009, http://ieeexplore.ieee.org/xpl/articleDetails.jsp?tp=&rnumber=53161618&contentType=Conference+Publications&SearchField%3DSearch_All%26queryText%3DLight+Load+Efficiency+Imorovement+for+PFC, 6 pps.

\* cited by examiner

BALANCING A LOAD BETWEEN POWER SUPPLIES TO INCREASE EFFICIENCY

BACKGROUND

Power systems supply power to support a load under a wide range of conditions from light to heavy. However, efficiency may suffer at both ends of the spectrum of the wide range of loading conditions due to circuit loss and other environmental influences.

BRIEF DESCRIPTION OF THE DRAWINGS

In the accompanying drawings, like numerals refer to like components or blocks. The following detailed description references the drawings, wherein.

DETAILED DESCRIPTION

Figure 1:
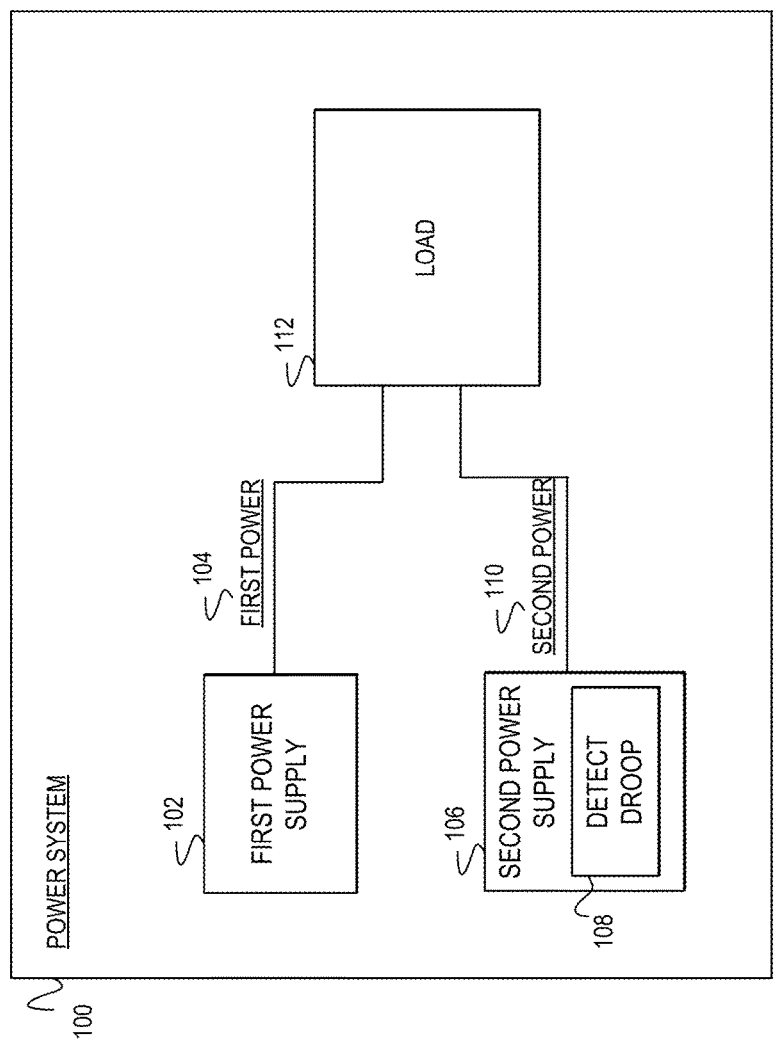
FIG. 1 is a block diagram of an example power system including a first power supply to provide a first power and a second power supply to detect a droop and provide a second power in addition to the first power to the load.

Power efficiency may decrease across a variable load. One solution switches a power supply on and off to maintain efficiency over variable loads. In this solution, a controller manages the power supply by turning it on and/or off when the power supply is near peak efficiency. However, this solution lacks the ability to dynamically adjust to various loading conditions. Additionally, this solution prevents the power supply from reaching peak efficiency if the load is at a threshold point where the peak efficiency drops. Further, this solution enables/disables the power supply, thus increasing the time it may take for the power supply to reach its respective peak efficiency.

In another solution, two different types of power supply circuits are used to switch between each of the supply circuits across variable loads. In this solution, the system utilizes a series power supply circuit for lighter load conditions as the series power supply circuit decreases in efficiency at higher loads, and a switching power supply to handle higher loads as the switching power supply decreases in efficiency at lower loads. However, in this solution, only one power supply circuit is enabled at a time which decreases the efficiency and resiliency of the power system in a fault condition. Additionally, this solution switches between the different power supply circuits based on a current measurement taken through a sensor at the load, which increases costs and design of the power system. Further, this power system solution is inefficient at higher loads, as it requires an additional cooling aspect further requiring additional power.

To address these issues, example embodiments disclosed herein provide a power system with a first power supply to deliver a first power to a load. The power system further includes a redundant power supply to detect a droop in the first. The droop is associated with a decrease in efficiency of the first power supply. Including a redundant power supply in the power system, increases the resiliency of the power system in a fault condition. Also, detecting the droop enables the power system to identify a threshold point of load power in which the efficiency of the power system begins to decrease. This decreases the cost, space, and design as no external devices are needed to detect the decrease in the efficiency of the power system.

Additionally, once detecting the droop, the redundant power supply balances the load by providing a second power in addition to the first power to the load to increase the efficiency of the power system. Balancing the load by providing the second power in addition to the first power to the load enables an autonomous management of the power system to increase the efficiency over variable loads. Further, providing the addition of the second power provides an overall more efficient power system as the power is spread across two or more power supplies, thus effectively keeping each power supply cooler at higher loads.

In another embodiment, a threshold point is identified with the first power supplied to the load. The threshold point is associated with a voltage droop corresponding to the first power. Identifying the threshold point, enables the power system to effectively detect when the first power supply may begin declining in efficiency.

In a further embodiment, the power system includes multiple diodes to prevent current sharing between the power supplies. This provides a feature safety to the power system as one power supply may be experiencing a fault.

In summary, example embodiments disclosed herein provide an autonomous management to increase the efficiency of a power system over variable loads. Further, example embodiments provide a more resilient power system to fault conditions while also reducing the cost and design.

Referring now to the drawings FIG. 1 is a block diagram of an example power system 100 including a first power supply 102 to provide a first power 104 to a load 112. The power system 100 also includes a second power supply 106 to detect a droop at module 108 of which is associated with a decrease in efficiency of the first power supply 102. Based on the droop detected at module 108, the second power supply 106 provides a second power 110 in addition to the first power 104 to the load 112, thus increasing the efficiency of the power system 100. The power system 100 includes electrical components used to supply, transmit, use, and/or convert power 104 and/or 110 to supply the load 112. Although FIG. 1 depicts the load 112 as part of the power system 100, this was done for illustration purposes and not for limiting purposes. For example, the load 112 may be included externally to the power system 100. Embodiments of the power system 100 include a power distribution system, computing device, power transmission system, power networking system, server power system, or any other type of power system capable of including the first power supply 102 and the second power supply 106 to provide the first power 104 and the second power 110 to the load 112.

The first power supply 102 provides the first power 104 to the load 112. In one embodiment, the first power supply 102 and the second power supply 106 are switched power supplies and connected in parallel with each other 102 and 106. In another embodiment, the first power supply 102 provides the sole power (i.e., the first power) 104 to the load 112. In this embodiment, the power system 100 is considered to be operating in a high efficiency mode. In a further embodiment, multiple diodes are between the load 112 and the power supplies 102 and 106. These embodiments are described in detail in later figures. Embodiments of the first power supply 102 include a power supply, energy storage, battery, fuel cell, generator, alternator, solar power, electromechanical supply, or other power supply capable of providing the first power 104 to the load 112.

The first power 104 is an electrical energy provided by the first power supply 102 to the load 112. Embodiments of the first power 104 include current, voltage, electrical charge, or other type of electrical energy provided by the first power supply 102 to the load 112.

The load 112 is considered a variable type of load as characteristics of the load 112, such as the impedance, voltage, and/or current of the load 112 may increase and/or decrease accordingly. These characteristics are either directly or indirectly proportional to the power the load 112 may pull. As such, the power 104 and 110 supplied to the load 112 may need to increase and/or decrease in response to the power the load 112 needs to operate. In one embodiment, the power system 100 is a server power system and the load 112 includes one or more servers to receive power 104 and/or 110. As the servers may be tasked to complete operations, the power consumed by the load 112 may increase and/or decrease. Embodiments of the load 112 include an electrical circuit, electrical impedance, or other type of circuit capable of receiving power 104 and 110 from the power supplies 102 and 106.

The second power supply 106 provides the second power 110 to the load 112 in addition to the first power 104. Providing the second power 110 enables the load 112 to be balanced between both the power supplies 102 and 106 which increases the efficiency of the power system 100. In an embodiment, the second power supply 106 is connected in parallel with the first power supply 102. In this embodiment, the power supplies 102 and 106 are switched power supplies. Providing switched power supplies 102 and 106 enables the power system 100 to operate efficiently at higher load 112. In another embodiment, the second power supply 106 is considered a redundant power supply to the first power supply 102. In a further embodiment, the second power supply 106 is separated from the first power supply 102. The second power supply may be similar in structure to the first power supply 102 and accordingly, embodiments of the second power supply may include a power supply, energy storage, battery, fuel cell, generator, alternator, solar power, electromechanical supply, or other power supply capable of detecting a droop at module 108 and providing the second power 110 in addition to the first power 104 to the load 112.

At module 108, the second power supply detects the droop in the first power 104 to the load 112. Module 108 detects the condition of when to supply the additional second power 110 to the load 112. In one embodiment, module 108 detects when to switch from a single power (i.e., the first power 104) providing power to the load 112 to a load-balanced mode where two or more power supplies (i.e., the first and the second powers 104 and 110) provide power to the load 112, based on a threshold point detection. The threshold point indicates the point at which the efficiency of the power system 100 begins to decline. This embodiment is described in detail in later figures. In another embodiment, the droop in the first power 104 corresponds to a decrease in efficiency of the first power supply 102. Embodiments of the module 108 include a set of instructions, instruction, process, operation, logic, algorithm, technique, logical function, firmware, and or software executable by a controller to detect the droop in the first power 104.

The second power 110 is provided by the second power supply 106 to the load 112 in addition to the first power supply 104 once detecting the droop at module 108. The second power 110 is provided to the load 112 to increase the efficiency of the power system 100 once the efficiency of the first power supply 102 begins to decline. The second power 110 may be similar in structure and functionality to the first power 104, and as such, embodiments of the second power 110 include current, voltage, electrical charge, or other type of electrical energy provided by the second power supply 106 to the load 112.

Figure 2:
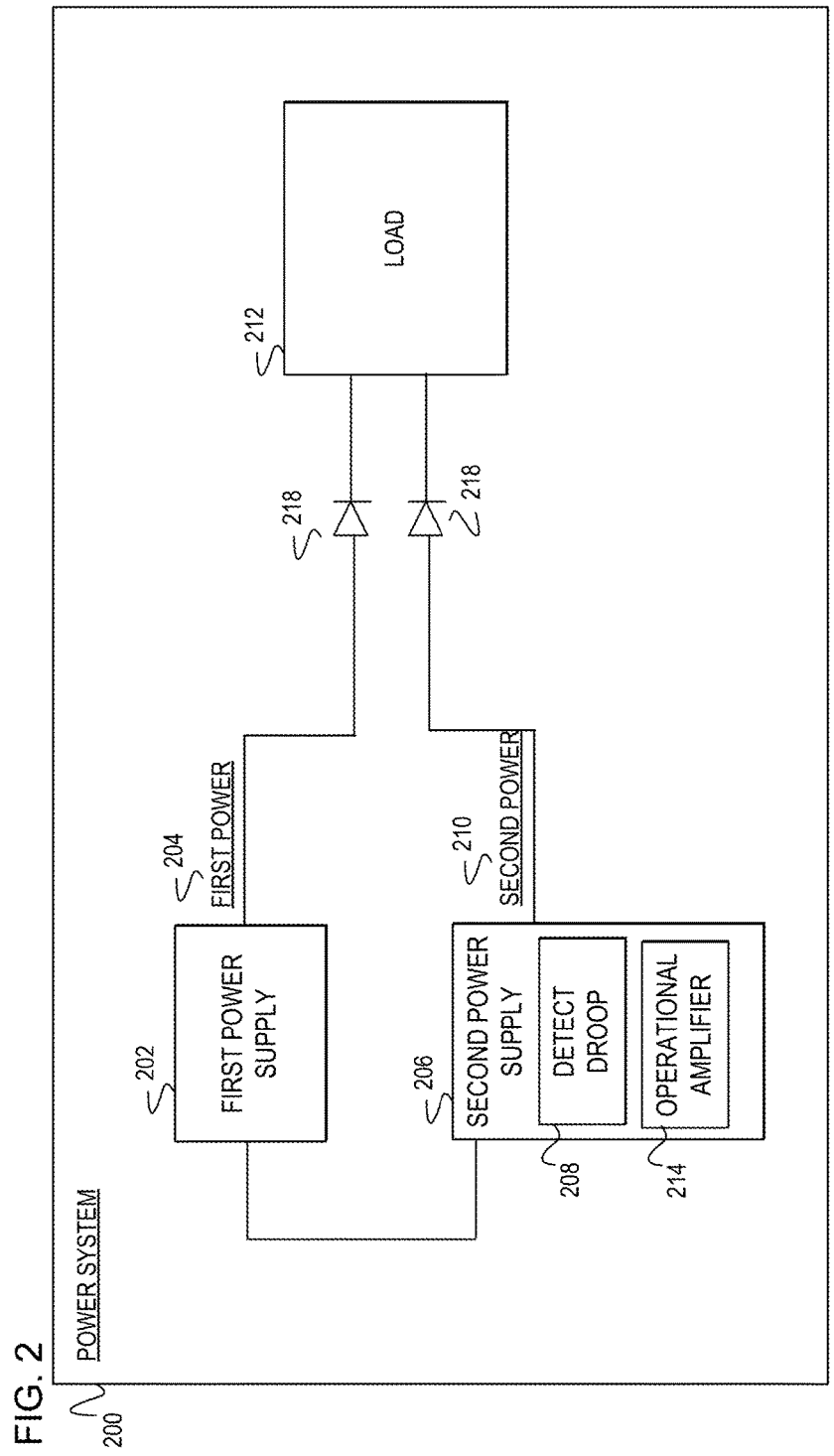
FIG. 2 is a block diagram of an example power system including a first power supply connected in parallel with a second power supply to supply a first power and based on detecting a droop by an operational amplifier and providing a second power through multiple diodes to a load.

FIG. 2 is a block diagram of an example power system 200 including a first power supply 202 connected in parallel with a second power supply 206 to supply a first power 204 to a load 212. Additionally, the power system 200 includes a second power supply 206 to detect a droop at module 208 by an operational amplifier 214. Further, based on the droop detection at module 208 the second power supply 206 provides a second power 210 in addition to the first power 204 to the load 212. The power system 200 further includes multiple diodes 218 located between the power supplies 206 and 202 and the load 212 to prevent current sharing. The power system 202, the first power supply 202, the first power 204, and the load 212 may be similar in structure and functionality to the power system 100, the first power supply 102, the first power 104, and the load 112 as in FIG. 1.

The second power supply 206 includes the module 208 to detect the droop which indicates a decline in efficiency of the first power supply 202 as supplying the first power to the load 212. In response to detecting the droop at module 208, the second power supply 206 transmits the second power 210 to the load 212 in addition to the first power 204. The second power supply 206 and the second power 210 may be similar in structure and functionality to the second power supply 106 and the second power 110 as in FIG. 1. The module 208 may be similar in functionality to the module 108 as in FIG. 1.

The operational amplifier 214 detects the droop at module 208 for the second power supply 206 to supply the second power 210 in response. The operational amplifier 214 is an electronic voltage amplifier with a differential input to produce an input voltage larger than the voltage difference between its input terminals. In this embodiment, the operational amplifier 214 may receive two inputs, one from a reference signal and another signal representing the magnitude of the first power 204. The operation amplifier 214 uses these two inputs to switch and supply the second power 210 to the load 212 in addition to the first power 204. Thus, when the magnitude of the reference signal is below the magnitude of the first power 204, this indicates the droop as detected at module 208 as the efficiency of the first power supply 202 decreases. This signals the second power supply 206 to provide the second power 210 to the load 212 in addition to the first power 204. Additionally, when the reference signal is equal or higher in magnitude than the first power 204, the second power 210 remains idle (i.e., not supplied to the load 212). In another embodiment, a comparator is used to detect the droop at module 208. The comparator utilizes the two input signals, one as a reference magnitude signal and a second input signal as the magnitude representing the first power 204.

The multiple diodes 218 prevent current sharing among the power supplies 202 and 206. The multiple diodes 218 are electrical components with minimal resistance to direct the path of current to flow in one direction (i.e., towards the load 112), while in the other direction (i.e., towards the power supplies 202 and 206), the resistance is high, preventing current sharing between the power supplies 202 and 206. Although FIG. 2 depicts the diodes 218 as external to the power supplies 202 and 206, this was done for illustration purposes and not for limiting purposes. For example, each of the diodes 218 may be included in each of the power supplies 202 and 206.

Figure 3:
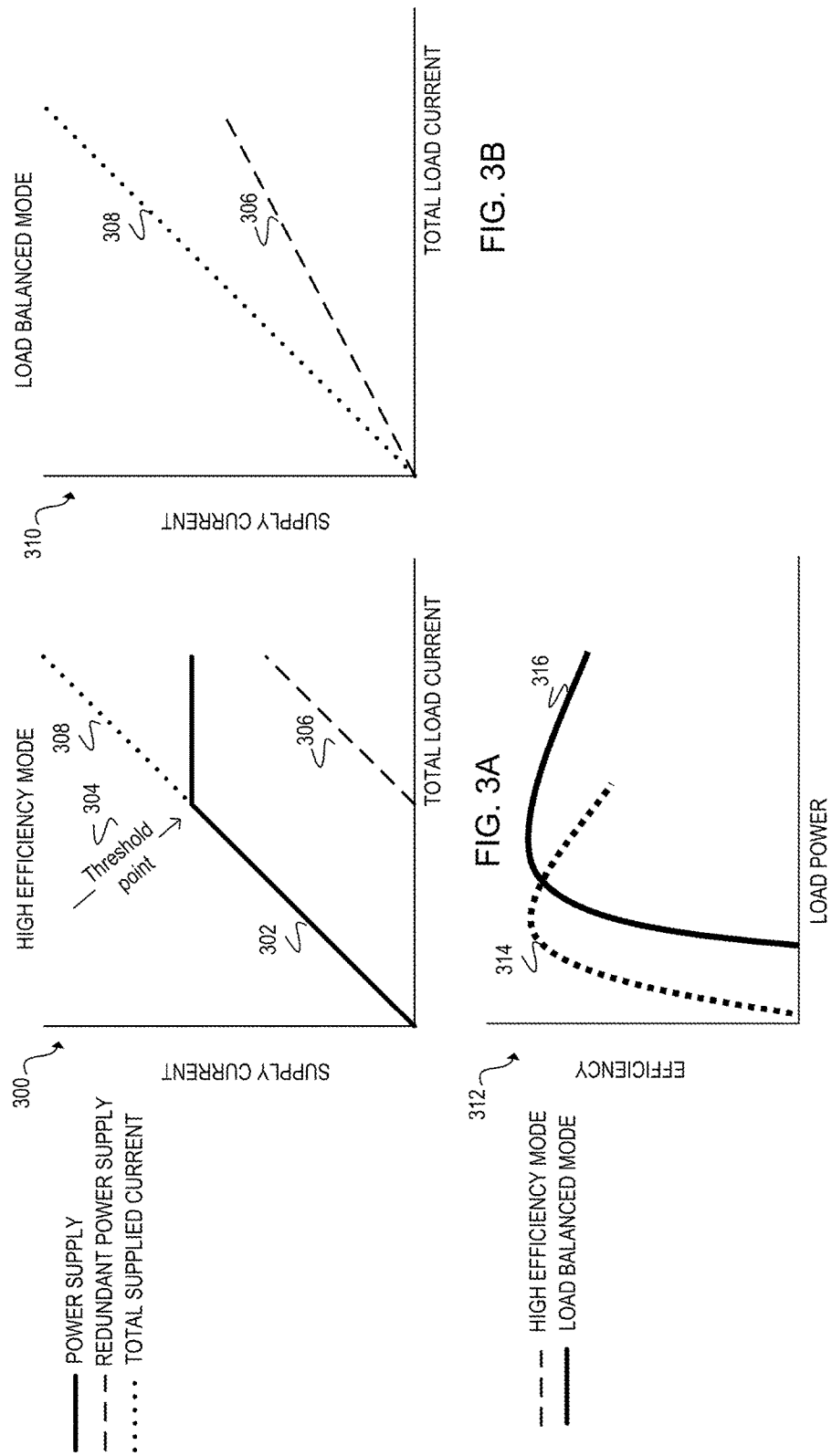
FIG. 3A is a data representation of an example graph representing a threshold point from a first supply current and a redundant power supply current over a variable load current.
FIG. 3B is a data representation of an example graph representing the total supplied current and a redundant supply current over a variable load current.
FIG. 3C is data representation of an example graph representing efficiency of a high efficiency mode and a balanced mode in a power system over a variable load power.

FIG. 3A is a data representation of an example graph 300 representing a threshold point 304 from a first power supply current 302, a redundant power supply current 306, and a combined total supply current 308 across a variable load current. The graph 300 uses the y-axis to represent the supply currents (i.e., the first supply and the redundant supply) and the x-axis to represent the total load current. Additionally, the graph 300 represents a high efficiency mode of a power system. The high efficiency mode is an operation of the power system of which the load receives power from a single source (i.e., the power supply) until the threshold point 304 point is detected. Then the power system switches to the load balanced mode as seen in FIG. 3B. The load balanced mode is an operation of the power system when the load receives power from both the power supply and the redundant supply.

The power supply current 302, represents one characteristic (i.e., current) of the first power as delivered from the first power supply to the load as in earlier figures. The supply current 302, reaches the threshold point 304 halfway up the supply current axis. It is at this point 304, the supply current 302 levels off to maintain an amount of current supplied to the load. The threshold point 304 corresponds to the power supply current 302 to indicate the point 304 before which the power supply current 302 may decline in efficiency to the load. The power supply 302 provides the sole power to the load in the high efficiency mode until the threshold point 304 is identified, as indicated in FIG. 3A.

The threshold point 304 is the point on the graph 300 of which the power supply current 302 associated with a decrease in efficiency of the power supply. Thus, the redundant power supply current 306 provides power in addition to the power supply 302, thus increasing the totally supplied current 308 to the load and increasing the efficiency of the power system. The threshold point 304 may be set by the power system administrator or may be detected by monitoring the efficiencies of the power supplies as seen in FIG. 3C.

The redundant power supply current 306 is considered one of the types of second power that is delivered to the load in addition to the first power by the power supply 302. As indicated in FIG. 3A, the redundant power supply 306 increases the power provided to the load, once the threshold point 304 is detected. When both power supplies (i.e., power supply and redundant power supply) are both providing power to the load, is referred to as the load-balanced mode. This is discussed more in FIG. 3B and FIG. 3C.

The total supplied current 308 increases linearly as indicated with the dotted line. The total supplied current 308 represents the combination of current between both the power supplies (i.e., the power supply and the redundant power supply).

FIG. 3B is a data representation of an example graph 310 representing a total supplied current 308 and the redundant power supply 306 current in a load-balanced mode over a variable load current. Additionally, the total current 308 includes a first power as supplied by a first power supply and the second power 306 as supplied by the redundant power supply. The load balanced mode is considered the mode when the redundant power supply 306 begins increasing the current supplied to the load once detecting the threshold point 304 in FIG. 3A. In this embodiment, the power system operates in the high efficiency mode as in graph 300 and switches to the load balanced mode as in graph 310. The graph 310 uses the y-axis to represent the supply currents (i.e., the first supply and the redundant supply) and the x-axis to represent the total load current.

FIG. 3C is a data representation of an example graph 312 representing efficiency of a power system in a high efficiency mode 314 and a load balanced mode 316 over a variable amount of load power. As indicated in the graph 312, the high efficiency mode 314 indicates a first power as supplied from a power supply (i.e., first power supply). The high efficiency mode 314 reaches a peak efficiency within one or more points of load power prior to slightly declining in the efficiency. This slight decline in efficiency indicates the threshold point. At this point, a second power is supplied to the load in addition to the first power, thus representing the load balanced mode 316. The load balanced mode 316 increases the efficiency of the power system with the higher variable loads as indicated with the dark line.

Figure 4:
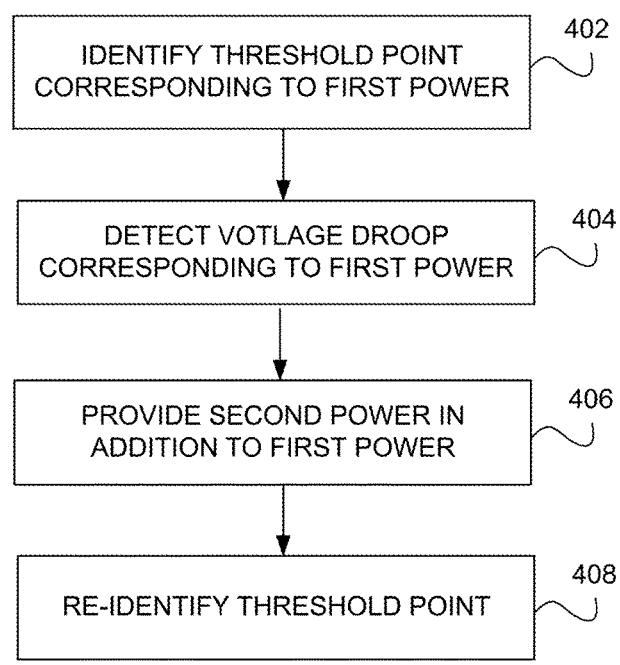
FIG. 4 is a flowchart of an example method to identify a threshold point corresponding to a first power provided by a first power supply, detect a voltage droop corresponding to the first power, provide a second power in addition to the first power to the load; and re-identify the threshold point.

FIG. 4 is a flowchart of an example method to identify a threshold point corresponding to a first power provided by a first power supply, detect a voltage droop corresponding to the first power, provide a second power in addition to the first power to the load; and re-identify the threshold point. Although FIG. 4 is described as being performed between power supplies 102, 106, 202, and 206 as in FIGS. 1-2, it may also be executed on other suitable components. For example, FIG. 4 may be implemented in the form of executable instructions on a machine-readable storage medium, such as machine-readable storage medium 504 in FIG. 5.

At operation 402, the threshold point is identified of which corresponds to the first power as provided by a power supply (i.e., first power supply). The threshold point indicates one or more magnitudes of power pulled by the load at which the efficiency of the power supply may begin to decrease. In another embodiment, operation 402 supplies the first power to the load.

At operation 404, a voltage droop is detected. The voltage droop corresponds to the first power as provided by the power supply. In one embodiment, the first power and a resistances are proportional to the voltage droop, according to Ohm's law, so the voltage declines when the power declines and/or when the resistance increases.

At operation 406 the second power is provided in addition to the first power to the load. The second power is provided by another power supply separate from the power supply which provides the first power. In one embodiment, the second power is provided from a second power supply, while in another embodiment, the second power is provided from a redundant power supply.

At operation 408 the threshold point as identified at operation 404 is re-identified. In this embodiment, the load may decrease (i.e., pull less power), thus it would be more efficient to supply the power to the load from the single source (i.e., the first power supply). In this embodiment, operation 408 monitors the efficiency with sharing the load between the power supply and the redundant power supply so the redundant power supply ceases supplying the second power to the load. Additionally, the redundant power supply may remain enabled so it may provide the second power any time the load increases.

Figure 5:
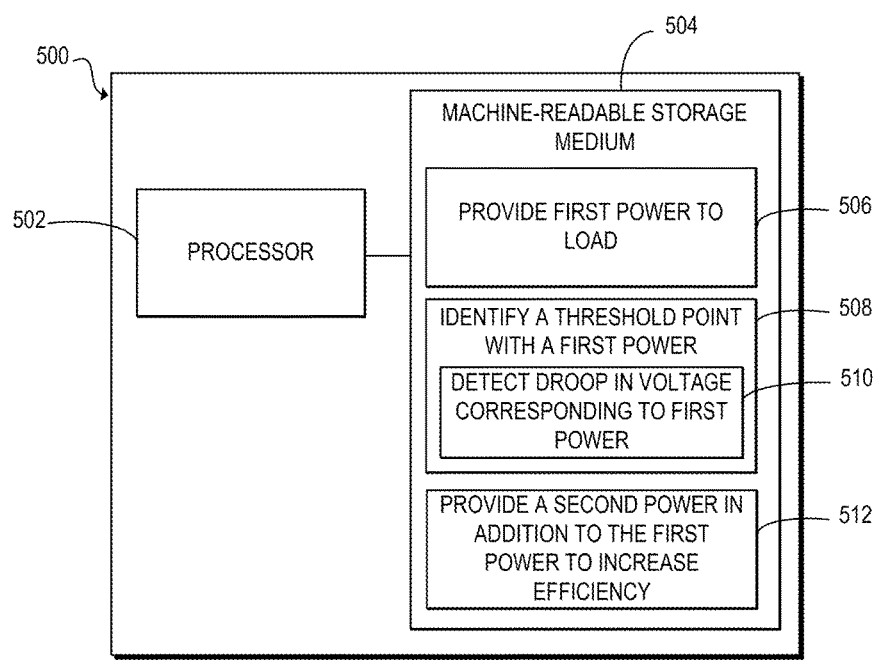
FIG. 5 is a block diagram of an example computing device to provide a first power to load, identify a threshold point with the first power, and in response provide a second power in addition to the first power to the load to increase efficiency.

FIG. 5 is a block diagram of an example computing device 500 to provide a first power to load, identify a threshold point with the first power, and in response provide a second power in addition to the first power to the load to increase efficiency. Although the computing device 500 includes processor 502 and machine-readable storage medium 504, it may also include other components that would suitable to one skilled in the art. For example, the computing device 500 may include a first power supply 102 and 202 as in FIGS. 1-2, respectively. Embodiments of the computing device 500 include a host device, computing device, client device, personal computer, desktop computer, laptop, a mobile device, a tablet or other electronic device suitable capable identifying the threshold point and supplying a second power in addition to a first power to a load.

The processor 502 may fetch, decode, and execute instructions 506, 508, 510, and 512. Specifically, the processor 502 executes: instructions 506 to provide a first power to a load; instructions 508 to identify a threshold point with the first power; instructions 510 to detect a droop in voltage corresponding to the first power; and instructions 512 to provide a second power in addition to the first power to the load to increase efficiency of a power system. Embodiments of the processor 502 include a controller, microchip, chipset, electronic circuit, microprocessor, semiconductor, microcontroller, central processing unit (CPU), graphics processing unit (GPU), visual processing unit (VPU), or other programmable device capable of executing instructions 506-512.

The machine-readable storage medium 504 may include instructions 506, 508, 510, and 512 for the processor 502 to fetch, decode, and execute. The machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

Instructions 506 provide the first power to the load. The first power may be provided by a power supply (i.e., first power supply).

Instructions 508 identify the threshold point with the first power. In one embodiment, instructions 508 identify the point where the first power is no longer as efficient in supplying power to the load. In this embodiment, the load may increase over time and as such, the first power will no longer be as efficient in supplying the load, thus identifying the threshold point enables a determination of when supplying the first power to the load will not be as efficient. In another embodiment, instructions 508 include detecting a droop in voltage corresponding to the first power, such as instructions 510.

Instructions 510 detect the droop in voltage corresponding to the first power. The first power may include current and as such, the first power has a corresponding voltage. In one embodiment, instructions 510 include detecting the droop in this voltage by using a comparator and/or operational amplifier to receive two signal inputs. One of the signal inputs includes the voltage supplied to the load from the first power supply while the second input includes a reference voltage. Thus the output includes the signal indicating the droop in voltage.

Instructions 512 provide the second power in addition to the first power to increase the efficiency of the power supply and/or power system. The second power is supplied by a second power supply (i.e., redundant power supply). Supplying the additional power enables the power to be provided by two separate power supplies, thus increasing the efficiency of the power system and/or power supply over the variable load.

In summary, example embodiments disclosed herein provide an autonomous management to increase the efficiency of a power system over variable loads. Further, example embodiments provide a more resilient power system to fault conditions while also reducing the cost and design.

We claim:

1. A power system comprising:
a first power supply to provide a first power to a load;
a second power supply to provide a second power to the load; and
a controller comprising a processor that is to execute instructions that cause the controller to:
allow the first power to be supplied to the load while preventing the second power from being provided to the load until a detection of a droop in the first power;
in response to the detection of the droop in the first power, allow the second power to be provided to the load in addition to the first power.

2. The system of claim 1 wherein the first and the second power supplies are switched power supplies and in parallel with each other.

3. The system of claim 1 comprising:
an operational amplifier to detect the droop in the first power to the load.

4. The system of claim 1 wherein the droop is a droop in a voltage corresponding to the first power.

5. The system of claim 1 further comprising:
multiple diodes between the first and the second power supplies and the load to prevent current sharing between the first and the second power supplies.

6. The power system of claim 1 comprising:
a comparator to detect the droop in the first power provided by the first power supply to the load.

7. A method of balancing a load by sharing between a power supply and a redundant power supply, the method comprising:
causing a controller comprising a processor to execute instructions that cause the controller to:

detect a threshold point corresponding to a drop in efficiency with a first power supplied from the power supply to the load;

power the load exclusively by the first power supply until the detection of the threshold point; and in response to the detection of the threshold point, provide a second power to the load by the redundant power supply in addition to the first power.

8. The method of claim 7 wherein the second power is supplied to the load in addition to the first power by sharing the load between the power supply and the redundant power supply to increase the efficiency of the power supply.

9. The method of claim 7 wherein the threshold point is associated with a voltage droop corresponding to the first power of the power supply.

10. The method of claim 7 further comprising:

wherein detecting the threshold point includes detecting a voltage droop corresponding to the first power using at least one of a diode, a comparator, and an operation amplifier.

11. The method of claim 7 further comprising:

re-identifying the threshold point to monitor an efficiency with sharing the load between the power supply and the redundant power supply, the redundant power supply ceases supplying the second power to the load and remains enabled while the power supply singularly provides the first power to the load.

12. The method of claim 7 wherein the first power provided from the power supply to the load is constant, while the second power provided from the redundant power supply to the load increases once identifying the threshold point.

13. The method of claim 7, comprising causing the controller to execute instructions that cause it to:

monitor the first power suppled to the load from the power supply; and detect a droop in the first power that indicates the threshold point.

14. A non-transitory machine-readable storage medium encoded with instructions executable by a processor of a computing device, the storage medium comprising instructions to:

detect a threshold point with a first power supplied from a power supply to a load, the threshold point associated with a drop in efficiency of the power supply;

power the load exclusively by the power supply until the detection of the threshold point;

in response to the detection of the threshold point, provide a second power by the redundant power supply in addition to the first power such that the combination of the first power and the second power balances the load and increases the efficiency.

15. The non-transitory, machine-readable storage medium including the instructions of claim 14, wherein to identify the threshold point associated with the drop in efficiency of the power supply is further comprising instructions to:

detect a droop in a voltage corresponding to the first power supplied from the power supply to the load.

16. The non-transitory, machine-readable storage medium including the instructions of claim 14 wherein both the power supply and the redundant power supply remain enabled and is further comprising instructions to:

provide by the power supply, the first power solely to the load until the threshold point is identified.

* * * * *